United States Patent
Whitehouse et al.

(10) Patent No.: US 8,842,822 B2
(45) Date of Patent: *Sep. 23, 2014

(54) SYSTEM AND METHOD FOR OPTIMIZING TERMINATION IMPEDANCE FOR AN ANALOG TELEPHONE LINE

(71) Applicants: John Whitehouse, Union Grove, AL (US); Scott Dendy, Arab, AL (US)

(72) Inventors: John Whitehouse, Union Grove, AL (US); Scott Dendy, Arab, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,932

(22) Filed: Mar. 15, 2013

(65) Prior Publication Data

US 2013/0336463 A1   Dec. 19, 2013

Related U.S. Application Data

(63) Continuation of application No. 12/372,902, filed on Feb. 18, 2009, now Pat. No. 8,401,174.

(51) Int. Cl.
*H04M 7/04* (2006.01)
*H04M 9/00* (2006.01)
*H04M 1/76* (2006.01)
*H04B 3/46* (2006.01)
*H04M 1/24* (2006.01)
*H04B 3/23* (2006.01)
*H04M 1/253* (2006.01)
*H04M 3/18* (2006.01)

(52) U.S. Cl.
CPC . *H04B 3/23* (2013.01); *H04M 1/76* (2013.01); *H04M 1/2535* (2013.01); *H04M 3/18* (2013.01); *H04B 3/468* (2013.01); *H04M 1/24* (2013.01)
USPC ................ 379/398; 379/406.04; 379/394

(58) Field of Classification Search
USPC .................... 379/406.04, 394, 398
See application file for complete search history.

(56) References Cited

U.S. PATENT DOCUMENTS

| | | | |
|---|---|---|---|
| 5,057,795 A * | 10/1991 | Napier | 331/78 |
| 6,862,350 B2 | 3/2005 | Dendy | |
| 6,952,472 B2 | 10/2005 | Zhang et al. | |
| 6,990,109 B2 | 1/2006 | Mitchell et al. | |
| 7,093,289 B2 | 8/2006 | McElroy et al. | |
| 7,142,533 B2 | 11/2006 | Ghobrial et al. | |
| 7,215,762 B2 | 5/2007 | Fang et al. | |
| 7,366,179 B2 | 4/2008 | McElroy et al. | |
| 2002/0051523 A1 | 5/2002 | Erb | |
| 2005/0053021 A1* | 3/2005 | Pong | 370/286 |
| 2007/0127697 A1 | 6/2007 | Fang et al. | |
| 2007/0133786 A1* | 6/2007 | Schulz et al. | 379/406.01 |

FOREIGN PATENT DOCUMENTS

EP   1333592   6/2003

* cited by examiner

*Primary Examiner* — Alexander Jamal
(74) *Attorney, Agent, or Firm* — Fish & Richardson P.C.

(57) ABSTRACT

A system and method in accordance with a non-limiting aspect minimizes echo return loss in a communications system. The dial tone is broken on an analog telephone line connected to a hybrid circuit having selectable impedance configurations and that interfaces a digital communications circuit and the analog telephone line. A white noise signal as a test call is inserted through the hybrid circuit onto the analog telephone line corresponding to a selected impedance configuration. The returned white noise signal is used for measuring the echo return loss. The test call is dropped. This process is repeated at different impedance configurations to obtain echo return loss measurements at each of the impedance configurations. The optimum impedance setting configuration is determined based on the results and applied to the hybrid circuit and typically set during a running telephone configuration.

16 Claims, 5 Drawing Sheets

SYSTEM AND METHOD FOR OPTIMIZING TERMINATION IMPEDANCE FOR AN ANALOG TELEPHONE LINE

FIELD OF THE INVENTION

The present invention relates to communication systems, and more particularly, to a system and method of reducing hybrid echo in a telephone system having an analog interface such as to a public switched telephone network and analog telephone terminal operating equipment.

BACKGROUND OF THE INVENTION

Telephone hybrids are often used with the public switched telephone network (PSTN) when the interface between a two-wire and four-wire circuit is implemented. As well known, a two-wire circuit has speech communications existing on the same wire pair, while overall switching and transmission functions are provided by a four-wire circuit with two separate sides of the four-wire circuit corresponding to transmit and receive. In those digital systems implemented in modern communication systems, each communication direction as transmit and receive is processed independently. A typical analog line card in a telephone central office includes a hybrid that adapts the four-wire network to the two-wire analog circuit. Energy passing from the four-wire to the two-wire circuit often is reflected back into the four-wire circuit section, creating an echo. This echo occurs in Voice-over-Internet Protocol (VoIP) communications systems and similar packet services such as using Session Initiation Protocol (SIP). The packet voice network typically does not require use of an echo canceller, but when it is interfaced to an analog communications line, the echo canceller is required.

Echo cancellation is important especially when an Integrated Access Device (IAD) or Integrated Communications Platform (ICP) includes Foreign Exchange Office (FXO) ports connected to the PSTN for implemented packet voice communications such as Voice-over-Internet Protocol (VoIP). When a packet voice network is connected to the PTSN using, for example, an ICP, via a two-wire analog interface, the ability of the echo canceller to operate on PSTN echo can be severely compromised if there is a strong local echo from the two-wire interface itself. Echo reduction requires that the FXO hybrid balance impedance be matched to the phone line. Because few installations are similar to each other, the amount of echo varies widely with each installation.

In some prior art systems, the impedance is adjusted by manually using one or more test calls and evaluating the echo for each impedance setting. The interface typically can have different balance impedances and the proper impedance selection can reduce echo. These prior art manual procedures were time consuming, took several minutes per line, and had to be repeated for each line. This manual process can be difficult when an Integrated Communications Platform (or similar platform) has up to ten FXO ports. For example, the manual impedance balancing method also requires on-site assistance where a test call has to be placed from a packet voice station behind the Integrated Communications Platform/Integrated Access Device (ICP/IAD) to the PSTN user. This is less than satisfactory because it is not always easy to differentiate local echo from the echo arising at some other point in the communications path. In a manual test procedure with the FXO under test, the transmit and receive gains are set to zero. The impedance is set to its default value, which is commonly about 600 ohms. Arrangements are made for someone on-site to place several test calls, while an external party receives these test calls. The test call is established from a Session Initiation Protocol (SIP) station behind the ICP to an external party through the FXO interface.

If the FXO is in a hunt group, the person performing the test uses a debug command at the ICP/IAD administrative operator console to verify that the call is going out through the right port. Otherwise, the person "hangs up" and calls again until the hunt group hits (transfers to) the desired port. After the called party answers, the debug command is used to find which DSP (digital signal processor) slot/port/channel is being used. The debug command is used to start a DSP white noise generator and echo return loss (ERL) measured on that channel. The ERL reading stabilizes in about five to about ten seconds. A human user maintains a record of the echo return loss. The impedance is set to the next value and the previous steps repeated.

After stepping through all the impedance values (for example, there could be 11), the DSP debug process is disabled and the FXO set for the impedance that yields the highest echo return loss. The transmit and receive gains are restored and the configuration saved. Optionally, it is possible to use the test call to check for echo and this is repeated for the next FXO interface.

Besides the initial drawbacks indicated above, there are other drawbacks in this manual procedure. For example, an on-site operator is required to place the test call and an off-site operator must receive the test call. Also, a user typically rotates through a hunt group to hit the desired FXO interface. It is also necessary for a user to interpret one debug output before the next one can be entered. Debug commands require up to 40 characters, which must be precisely entered. The customer configuration for transmit and receive gain then must be changed and restored.

One known utility program termed FXOtune tunes various settings on FXO modules for analog cards, optimizes the line characteristics of a time division multiplexing (TDM) device to minimize echo by balancing the hybrid, and adjusts line impedance. Another system is disclosed in U.S. Pat. No. 7,215,762, which discloses a technique that selects impedance settings for a loop start trunk line in a network that extends a four-wire circuit to a subscriber's premise, i.e., a private branch exchange (PBX), from a local exchange or central office (CO). The disclosed method selects an optimum impedance for a loop start trunk line by successively applying respective ones of a plurality of impedance settings to the loop start trunk line and for each impedance setting measuring the impulse response of the trans-hybrid echo path by applying audio test signals to obtain a time-domain trans-hybrid transfer function. It derives a frequency-domain spectrum representative of the trans-hybrid loss. It then calculates a figure of merit of the transfer function based on the power spectrum. Once all impedance settings have been tested, the optimum impedance is selected as the impedance setting associated with the highest calculated figure of merit. It uses a separate test circuit and a pre-prepared test file (215). It requires synchronization of sent and receive signals (235), and compares and analyzes the received data after the test call is dropped rather than during the test call itself.

It is desirable that a new system and method be implemented that overcomes the drawbacks identified above and can be suitable for remote operation and used without manually reconfiguring any ports under test and can initiate test calls automatically.

SUMMARY OF THE INVENTION

A system and method in accordance with a non-limiting aspect minimizes echo return loss in a communications system. The dial tone is broken on an analog telephone line connected to a hybrid circuit having selectable impedance configurations and that interfaces a digital communications circuit and the analog telephone line. After the telephone line is quiet, a white noise signal as a test call is inserted through the hybrid circuit onto the analog telephone line corresponding to a selected impedance setting configuration. The returned white noise signal is used for measuring the echo return loss corresponding to the selected impedance setting configuration. The test call is dropped. This process is repeated with multiple test calls each at a selectively different impedance setting configuration to obtain echo return loss measurements at each of the impedance setting configurations. The optimum impedance setting configuration is determined based on the results determined from the different test calls. The optimum impedance setting configuration is applied to hybrid circuit interface.

In one aspect, a single DTMF digit is transmitted for breaking the dial tone. In another aspect, a temporary loopback account is created for each test measurement. A loopback account has an associated phone number and automatically answers whenever it is called. A packet voice telephone voice system interfaces a public switched telephone network (PSTN) via the hybrid circuit. An echo canceller channel is connected to a Foreign Exchange Office (FXO) port under test and is reserved for testing. Balance impedances corresponding to selected impedance setting configurations are simulated in one aspect by loading different coefficients within a transverse digital filter of a codec connected between the hybrid and an echo canceller.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with a non-limiting example, the system and method as a tool optimizes termination impedance for analog telephone line terminal equipment and eliminates the requirement for an on-site operator and automates configuration changes to reduce operator errors. The tool eliminates trunk hunting and automates interpretation of any digital signal processing debug outputs. The tool is, in one aspect, a software tool used with different analog telephone line terminal equipment and for use with the Integrated Communication Platform (ICP) equipment shown in FIG. 1 that connects the ICP to an analog telephone line over a two-wire analog line. This analog line as viewed by the illustrated ICP has an impedance with a range of values.

Figure 1:
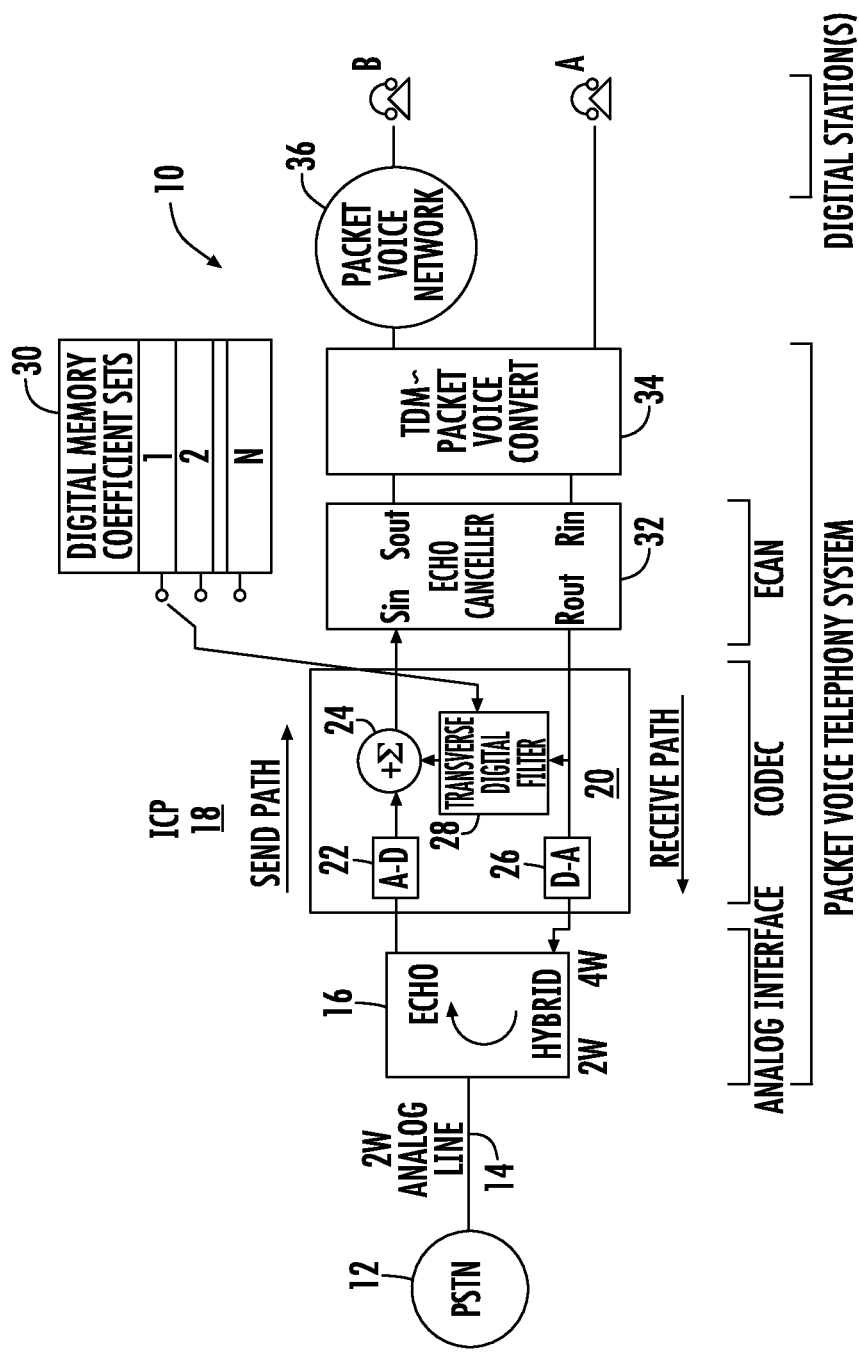
FIG. 1 is a block diagram of a portion of the circuit components of a communications system using, for example, the illustrated Integrated Communications Platform (ICP) for the system and method in accordance with a non-limiting example of the present invention.

The different components illustrated in FIG. 1 for an overall communications system 10 include the PSTN 12 that connects by the two-wire analog line 14 to the hybrid 16 as part of the ICP 18. The hybrid 16 provides an analog interface and the ICP is part of a packet voice telephony system using Voice over Internet Protocol (VoIP). The tool as described could be used, however, for ISDN and other digital network services. Typically, a VoIP and ISDN do not require hybrids, but when calls have the VoIP network on one end and the packet voice network terminates to an analog line at the other end such as shown with the PSTN 12 in FIG. 1, there is still a significant source of echo from the hybrid on a line card and the phone itself. Even though many hybrids have good trans-hybrid loss with little of the send echo appearing on the receive port, there is leakage that can cause echoes when there is a delay in the transmission path, for example, with VoIP connections. Thus, a speaker's voice traversing to a far-end hybrid would return to their own receiver with insufficient attenuation. Cancellation would depend upon a balancing network having a frequency versus impedance characteristic that matches the line accurately. The hybrids can use digital signal processing to implement an adaptive filter and adjust to it.

As further illustrated in FIG. 1, a CODEC 20 includes a receive and send path as illustrated and includes an analog-to-digital (A-D) converter (ADC) 22 connected to the hybrid 16 in the transmit path and connecting into a summer circuit 24. The receive path as illustrated includes a digital-to-analog (D-A) converter (DAC) 26 that connects to the analog interface via the hybrid 16. The CODEC 20 also includes a transverse digital filter 28 as a non-limiting example that simulates the balance impedance. A number of digital memory coefficient sets 30 are stored in a memory and used with the transverse digital filter 28. An echo canceller (ECAN) 32 connects to the CODEC 20 and includes appropriate "in" and "out" ports on the transmit (or send) path and "in" and "out" ports on the receive path, as illustrated. The echo canceller 32 connects to a time division multiplexing (TDM) packet voice converter circuit or network 34, which connects to a packet voice network 36 such as used in Voice over Internet Protocol (VoIP) communications. The TDM packet voice converter circuit or network 34 connects to a digital phone B. Another phone A is also illustrated. Many other phones can be included.

As noted before, the analog line as viewed by the ICP 18 has an impedance with a range of values. The setting of the transverse digital filter 28 will determine the amount of echo received by a user at the digital phone. A large echo is undesirable and indicates a poor quality of service, and thus, it is important to set the value of the transverse digital filter that maximizes the echo return loss. The coefficients 30 for the digital filter are stored in a memory and are loaded into the digital filter for a series of tests in accordance with a non-limiting example.

The codec 20 typically includes digital signal processing. Transverse digital filter 28 works in conjunction with the digital memory coefficient sets 30, to effectively determine the balance impedance of connected hybrid 16. Coefficient sets 30 are preset values, one set for each balance impedance. Echo return is used to determine which is the best balance impedance. Thus, the echo return loss (ERL) measurement of the echo canceller is used to evaluate the balance impedance. In one aspect, this is accomplished with a wideband white noise stimulus. An echo canceller device that can be incorporated with the system 10 is a G.168 device test suite that provides a comprehensive assessment of echo canceller performance. Examples of IAD's and echo cancellers that can be used and modified include those disclosed in commonly assigned U.S. Pat. Nos. 7,366,179; 7,142,533; 6,862,350; and 7,093,289, the disclosures which are hereby incorporated by reference in their entirety.

The impedance measurement and optimization tool as described (and also referred to herein as the tool) can be software that runs in the embedded packet voice telephony system in the operating software, and thus, runs in the embedded code as implemented. It can be addressed through an administrative portal. The tool uses a wideband noise injected into the receive path of CODEC 20 in a non-limiting example as shown in FIG. 1 by echo canceller 32. It is possible to complete a test call in about four seconds and test 11 or 12 impedances in under one minute. A "dummy" call can be made to the PSTN and the system, e.g., including the echo canceller (and associated components), measures the echo coming back from the hybrid. It is possible to place a call into the PSTN and wait for the dial tone and send a single digit to break the dial tone to be assured of a quiet termination. The system and method can also work for the network and hybrid echo.

FIG. 2 through FIG. 5B are flowcharts for a basic sequence of operations that optimizes termination impedance such as for an analog telephone, and more particularly, telephone line terminal equipment. Reference numerals begin in the 100 series and continue through an increasing series for the respective flowcharts.

Figure 2:
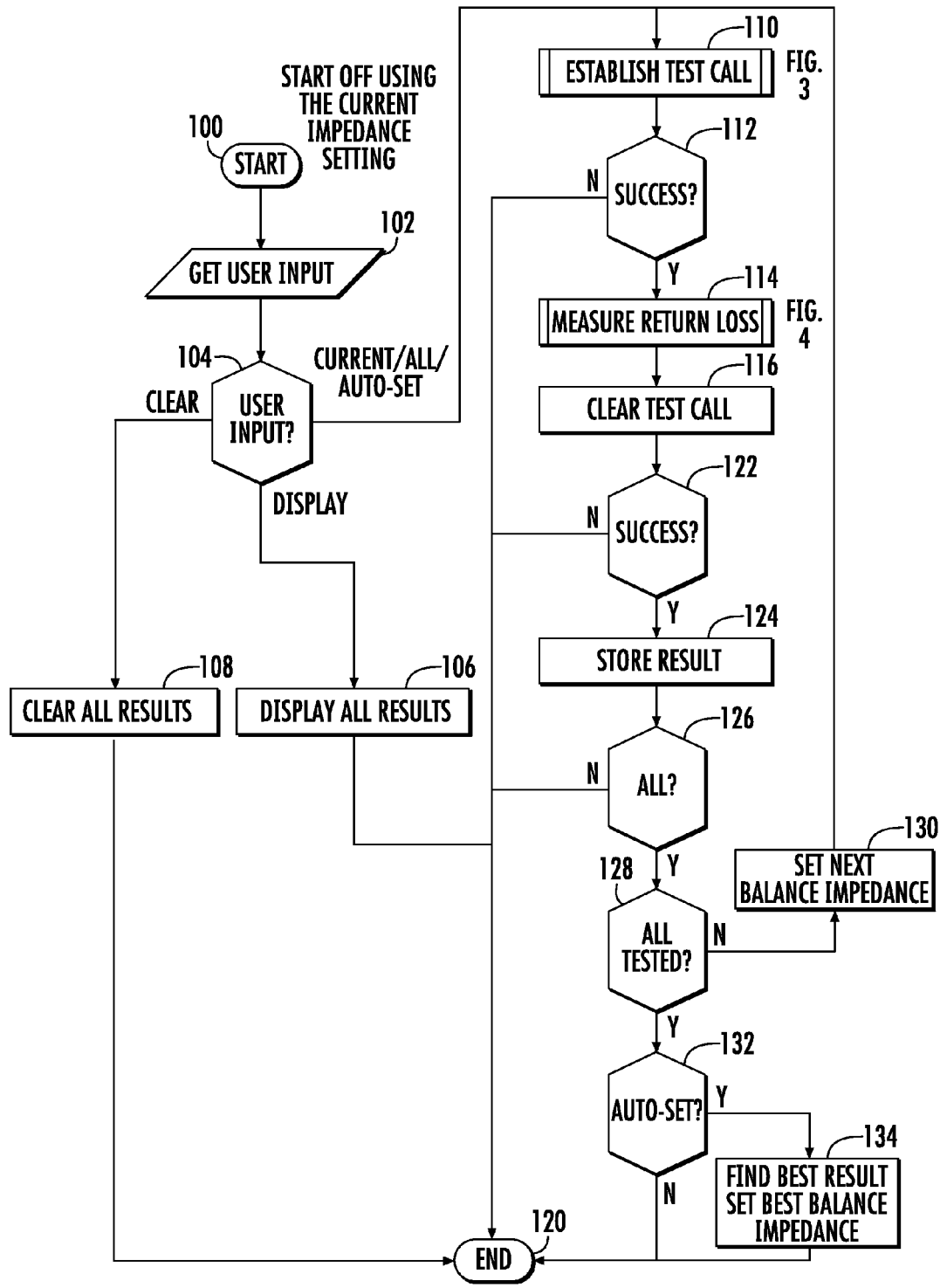
FIG. 2 is a high-level flowchart showing an example method for optimizing termination impedance and setting a best balance impedance such as used in the ICP shown in FIG. 1 in accordance with a non-limiting example of the present invention.

As shown in FIG. 2, the process begins at start (Block 100) and user input is obtained (Block 102). At this time, the user is presented with different options (or choices) for user input (Block 104) such as CURRENT, which measures the return loss with the currently configured balance impedance. The choice ALL measures the return loss for all available balance impedances. ALL with the choice AUTO-SET adjusts the impedance setting of the port under test for the best return loss. The DISPLAY choice will show a table of results (Block 106) and the balance impedance versus the return loss. A choice of CLEAR will clear the table of results (Block 108). For the first three options of CURRENT, ALL and AUTO-SET, the user input is stored for later use and a test call is made. In all cases, this first test call is made using the balance impedance currently configured in the port under test. The establish test call routine is shown at Block 110 and is described further relative to FIG. 3. If the test call is successfully established (Block 112), a return loss is measured (Block 114) with the measurement process shown in further detail relative to FIG. 4. The test call is cleared (Block 116).

If there was no success (Block 112), the operation ends (Block 120) and control is returned to the user. If the measured return loss is successful (Block 122), the result is stored in the table of results (Block 124). The user input is examined to determined whether the measurement is to be repeated using another balance impedance setting by determining if ALL has been selected (Block 126), which corresponds to measuring return loss for all available balance impedances (Block 128). If all have not been tested, the next balance impedance is set (Block 130). If ALL have been tested and AUTO-SET is selected (Block 132), the best result at the best balance impedance is found and set (Block 134). As an example, the order in which impedances can be tested could be sequential. If the available impedances are Z1, Z2, Z3, Z4 and the CURRENT setting is Z3, the test order could be Z3, Z4, Z1, Z2 in this non-limiting example.

Figure 3:
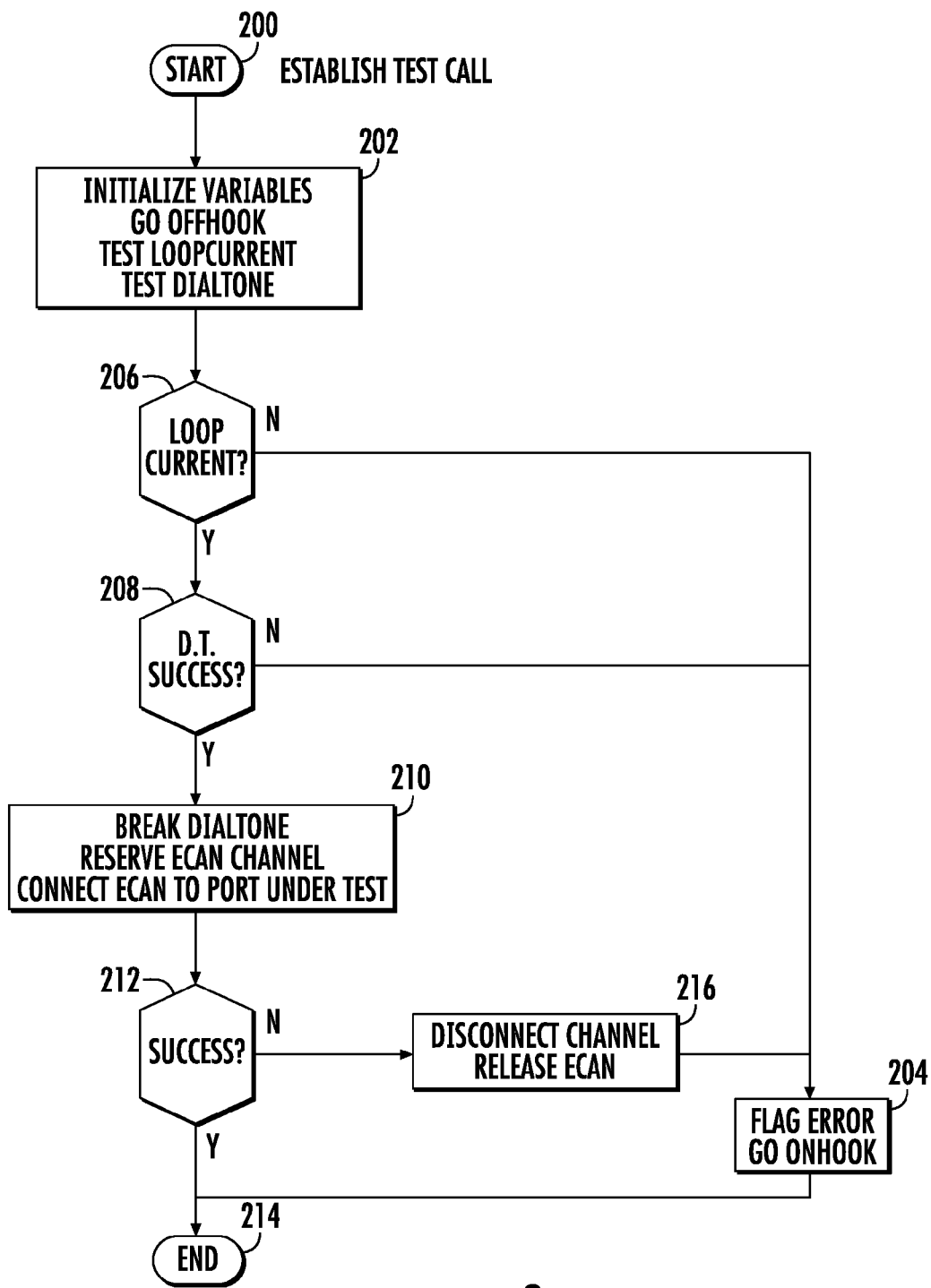
FIG. 3 is a high-level flowchart showing a sequence of steps for establishing test calls as Block 110 in the process shown in FIG. 2 in accordance with a non-limiting example of the present invention.

FIG. 3 illustrates the routine for establishing a test call. The process starts (Block 200) and the variables are initialized. After initialization, the procedure makes the port under test go offhook toward the connected network. The presence each of the loop current and dial tone are tested (Block 202), and if either fails, control is returned to the main operation as shown by the error flag and go onhook (Block 204). If there is a loop current (Block 206) and dial tone (D.T.) success (Block 208), the dial tone is broken and the echo canceller channel reserved and connected to the port under test (Block 210). Testing under these conditions is a function of the port under test and not of the automatic impedance tool itself. The port can be set to ignore them. Dial tone is broken by outpulsing a single address digit to connect the port to an echo canceller channel. The echo canceller provides a source of band limited white noise and the device (or circuit) for measuring the return loss. If there is success (Block 212), the process ends (Block 214). If there is no success, the channel is disconnected to release the echo canceller (Block 216) and the error flag occurs as illustrated at Block 204.

Figure 4:
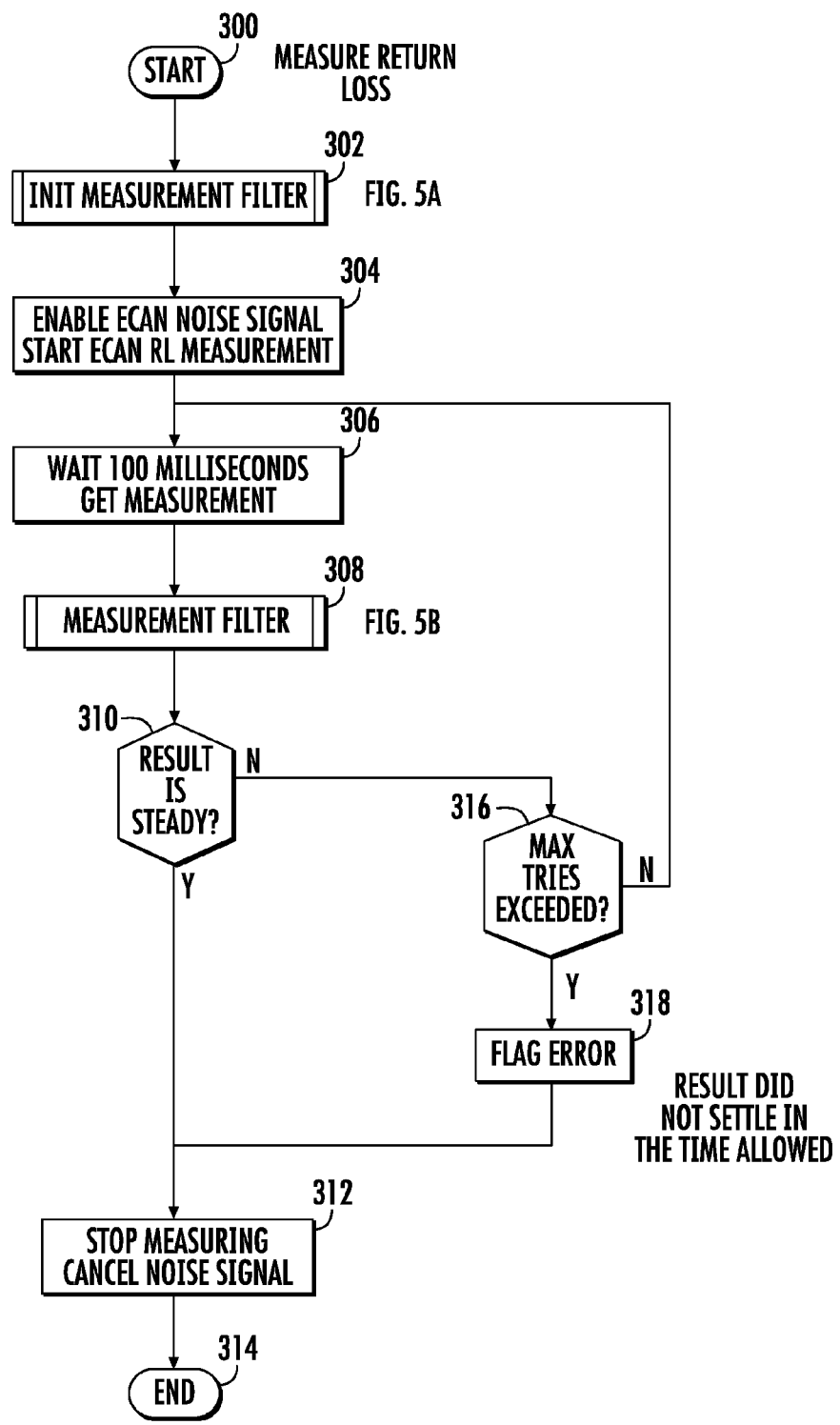
FIG. 4 is a high-level flowchart showing a sequence of steps for measuring return loss as Block 114 in the process shown in FIG. 3 in accordance with a non-limiting example of the present invention.
Figure 5A:
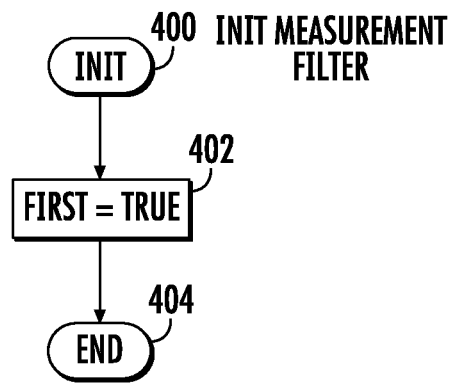
FIG. 5A is a high-level flowchart showing the initial measurement filtering as Block 302 of FIG. 4.

FIG. 4 is a flowchart illustrating basic steps used for measuring the return loss as shown at Block 114 in FIG. 2. The process starts (Block 300) with measuring return loss and initiating the filter measuring process (Block 302) (which is shown in FIG. 5A in greater detail). The automatic impedance tool uses the echo canceller and enables the noise signal and measures the return loss (RL). This process is enabled by the echo canceller noise signal to start the echo canceller return loss measurement (Block 304). After turning on the echo canceller noise signal (white noise), the tool periodically retrieves return loss readings from the echo canceller and filters them after first waiting 100 milliseconds to get a measurement (Block 305) followed by filter measuring (Block 308) (which is further described in the flowchart shown in FIG. 5B). Control is returned when filtered readings become steady and when that determination has been made (Block 310). Measurements stop and the noise signal is cancelled (Block 312) to end (Block 314) the process and return control to the user. Control will also be returned if the filtered reading fails to become steady within a predetermined number of readings. For example, if the result is steady, then the measurements are stopped and the noise signal cancelled. If the results are not steady, then the determination is made if a maximum number of tries are exceeded (Block 316), and if not, the process begins again with the measurements. If yes and the result did not settle in the time allowed, a error flag is maintained (Block 318) and the measurement stopped to end the process.

FIG. 5A shows an initial measurement filtering process and the initiation beginning (Block 400). A determination is made if the first measurement equals "true" (Block 402) and the process ends (Block 404). The measurement filter applies a simple single-poll low pass filter to INPUT to produce the RESULT. The INPUT range of the filter is an integer in the range 0 to 99. Each new RESULT is obtained by generating a weighted sum of the previous RESULT and the new INPUT. The sum of the weighting factors is unity. The equation associated with the filter is: RESULTS(n)=RESULTS(n−1)×(1−k))+(INPUT(n)×k). In the standard implementation, k is constant. In one aspect, the automatic impedance for the first INPUT, k, is 1.0. Thereafter, it could be a constant 0.2. This shortens the number of INPUT samples required to reach a steady RESULT and contributes to the speed at which the tool can take readings. A steady RESULT is declared when the difference between two successive RESULTS is less than 0.2.

Figure 5B:
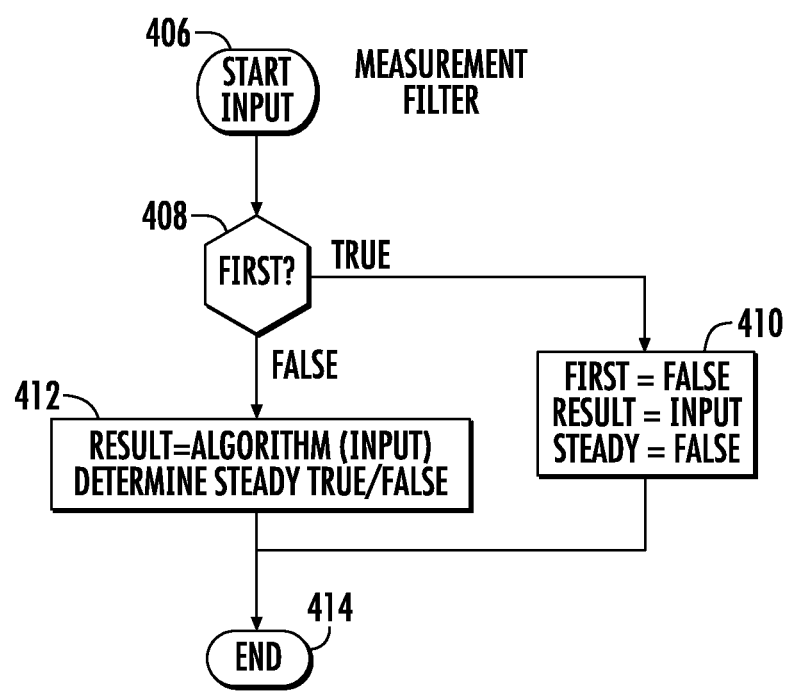
FIG. 5B is high-level flowchart showing the steps in a measurement filtering process as Block 308 shown in FIG. 4 after waiting a predetermined time.

The flowchart in FIG. 5B shows the INPUT as a start (Block 406) for the measurement filter and a determination as to whether the first measurement is true (Block 408) and if so, the FIRST=FALSE, RESULT=INPUT, and STEADY=FALSE (Block 410). If a determination is made as to false at Block 408, then the RESULT is the algorithm (INPUT) and a determination of STEADY for TRUE/FALSE (Block 412). The process ends (Block 414).

In accordance with a non-limiting example, a dummy call and loopback account is used, and no on-site or off-site operator is required. In one aspect, the test signal is a noise signal sent to a network destination, in this case, the PSTN 12, some portion of which is returned as echo. Although the term "tool" is used in the description, it should be understood that this term can refer to the impedance optimization process as described and a software call and processor routine used by various devices, including the echo canceller and other circuit components such as shown in the example of FIG. 1. In one aspect, the tool is used for one FXO interface at a time and the tool steps through all impedance settings as described before.

For each impedance setting, the FXO port goes off hook towards the telephone system (such as the central office) and listens for a dial tone. The tool outpulses a DTMF digit to break the dial tone. The trunk remains quiet and terminated for about 15 seconds. When the line is quiet, the tool sends a "dummy" call to the loopback account, for example, in a preferred embodiment as white noise. The tool invokes a digital signal processor, echo return loss (DSP ERL) debug process to make a measurement of the echo return loss. After each measurement, the dummy call is dropped. The duration of the dummy call is about four to ten seconds in a non-limiting example. This process is repeated. After stepping through, the tool reports Impedance versus ERL (Echo Return Loss). Optionally, the best match impedance is applied to a running configuration. The tool saves a customer configuration for receive-gain and transmit-gain and restores them when it exits.

Some results show that it may take 30-60 seconds for each FXO interface. An incoming call in the interval between dummy calls could cause the cycle to be abandoned. A goal is to keep such interval very short to reduce that possibility.

In accordance with a non-limiting example, the FXO interface seizes the telephone line using settings configured in the trunk to which it is connected. This could be a blind dial or ground start. The tool creates a temporary loop back account to use for each measurement. This account, however, is not accessible externally. A unique calling name can identify test calls in the Station Message Detail Reporting (SMDR). The tool can be extended to all voice products that have a DSP, plus one or more FXO interfaces such as an IAC, IGP and ICP.

In a non-limiting example, the tool can be accessed and its results can be displayed in similar fashion to other ICP/IAD administrative functions in one of three ways—(1) by local access to an ICP/IAD administrative port, (2) by administrative console access via the web and a PC, or (3) by web/gui access via the web and a PC. In (2) and (3) the PC can be geographically remote. Sufficient security protocols can be established as necessary.

The echo return loss tool can have an interface with a FXO/test command tree for user interface and instructions. An interface for the FXO slot/port could be followed by a "test" function input that enables a two-wire interface test. This can be followed by an "erl current" input for measuring echo return loss using the current impedance setting. An interface for "erl all" can measure the echo return loss for all available impedance settings. Impedance availability can be tested by checking for CODEC coefficients. The "erl all auto-set" input function would find and set the impedance for the best echo return loss. A "erl clear-results" input function would clear the ERL test results. The "erl display-results" input would display the echo return loss test results.

The "no" version of all commands is fully supported. It will cancel any test action in progress and return to the command prompt, namely:
   no test erl
   no test erl all
   no test erl all auto-set
   no test clear-results
   no test erl current
   no test erl display-results To be able to monitor basic information about test progress, a "debug voice erl-tool info" command entered at the administrative console could be used. Alternatively, a "debug voice erl-tool state-machine" command would display detailed diagnostic information when the tool is run. An example of console output with "debug voice erl-tool info" enabled is set forth below:

Sample 1:
test erl current<CR>
12:01:05 ERL.INFO fxo 0/2 erl measurement started, using impedance 900r
12:01:09 ERL.INFO fxo 0/2 impedance 900r—measured erl 25 dB
2008.08.21 12:01:09 ERL.INFO fxo 0/2 erl test finished Sample 2:
test erl all auto-set
12:24:50 ERL.INFO fxo 0/2 erl measurement started, using impedance 600c
12:24:55 ERL.INFO fxo 0/2 impedance 600c—measured erl 14 dB
12:24:55 ERL.INFO fxo 0/2 erl measurement started, using impedance 900r
12:25:00 ERL.INFO fxo 0/2 impedance 900r—measured erl 25 dB
12:25:00 ERL.INFO fxo 0/2 erl measurement started, using impedance 900c
12:25:05 ERL.INFO fxo 0/2 impedance 900c—measured erl 20 dB
12:25:05 ERL.INFO fxo 0/2 erl measurement started, using impedance z1
12:25:11 ERL.INFO fxo 0/2 impedance z1—measured erl 10 dB
12:25:11 ERL.INFO fxo 0/2 erl measurement started, using impedance z2
12:25:16 ERL.INFO fxo 0/2 impedance z2—measured erl 10 dB
12:25:16 ERL.INFO fxo 0/2 erl measurement started, using impedance z3
12:25:21 ERL.INFO fxo 0/2 impedance z3—measured erl 10 dB 12:25:21 ERL.INFO fxo 0/2 erl measurement started, using impedance z4
12:25:27 ERL.INFO fxo 0/2 impedance z4—measured erl 8 dB
12:25:27 ERL.INFO fxo 0/2 erl measurement started, using impedance z5
12:25:32 ERL.INFO fxo 0/2 impedance z5—measured erl 9 dB
12:25:32 ERL.INFO fxo 0/2 erl measurement started, using impedance z6
12:25:37 ERL.INFO fxo 0/2 impedance z6—measured erl 10 dB
12:25:37 ERL.INFO fxo 0/2 erl measurement started, using impedance z7
12:25:43 ERL.INFO fxo 0/2 impedance z7—measured erl 12 dB
12:25:43 ERL.INFO fxo 0/2 erl measurement started, using impedance 600r
12:25:48 ERL.INFO fxo 0/2 impedance 600r—measured erl 15 dB
12:25:48 ERL.INFO fxo 0/2 Best result is 25 dB using impedance setting 900r
2008.08.21 12:25:48 ERL.INFO fxo 0/2 Configuration has been automatically updated Appropriate commands must be issued to preserve configuration
2008.08.21 12:25:48 ERL.INFO fxo 0/2 erl test finished When the ICP/IAD is first powered up, the embedded application creates a database table of results, one for each FXO interface. The table is initially empty. The table holds test results for later viewing. The table can be cleared, which the operator may choose to do before rerunning the test. The contents do not survive a reboot.

In a non-limiting example, test results can be displayed in one of three ways: (a) test erl display-results; (b) show interface FXO slot/port; and (c) web/gui as part of an interface. Non-limiting examples now follow:
Sample 3:
test erl display-results

| Port | Impedance | Status | Measured ERL |
|---|---|---|---|
| fxo 0/2 | 600c | | 14 dB |
| fxo 0/2 | 900r | | 25 dB |
| fxo 0/2 | 900c | | 20 dB |
| fxo 0/2 | z1 | | 10 dB |
| fxo 0/2 | z2 | | 10 dB |
| fxo 0/2 | z3 | | 10 dB |
| fxo 0/2 | z4 | | 8 dB |
| fxo 0/2 | z5 | | 9 dB |
| fxo 0/2 | z6 | | 10 dB |
| fxo 0/2 | z7 | | 12 dB |
| fxo 0/2 | 600r | | 15 dB |

Sample 4:
show interface fxo 0/2
fxo 0/2 is UP
   Two-wire Status: Onhook
   Test Status: INACTIVE
   No Tests
   Impedance: 600 ohms+2.16 uF
   Transmit Gain: +10.0 dB
   Receive Gain: +6.0 dB
   Measured ERL: 14 dB The displayed "Measured ERL" corresponds to the result table entry for the configured impedance. If the impedance setting is changed, the displayed "Measured ERL" changes accordingly. If there is no corresponding result, "Measured ERL not available" is displayed instead.

The error "% could not run ERL test" is a result of attempting to use an administrative console session to run the tool when it is already in use from another console session.

During test execution, the operator is warned when a test sequence terminates abnormally. Reasons include not being able to seize the line, line disconnects during test, DSP timeout, and test runs for more than 120 seconds. In case of abnormal termination, FXO port settings are restored and it is returned to normal service.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for minimizing echo return loss in a communications system, the communications system including a hybrid circuit having selectable impedance configurations and that interfaces a digital communications circuit and the analog telephone line, the method comprising:
selecting a simulated balance impedance configuration within a filter connected to the hybrid circuit;
simulating balance impedances corresponding to selected impedance setting configurations by loading different coefficients within a transverse digital filter of a CODEC connected between the hybrid and an echo canceller;
inserting a test signal through the hybrid circuit onto the analog telephone line;
receiving a returned test signal from the analog telephone line through the hybrid circuit and measuring the echo return loss of the test signal corresponding to the selected simulated balance impedance configuration; and
determining an optimum balance impedance configuration based on the returned test signal.

2. The method of claim 1, further comprising, for each of the selectable impedance configurations, repeating with multiple test calls each at a selectively different impedance setting configurations to obtain echo return loss measurements at each of the impedance setting configurations.

3. The method according to claim 1, further comprising creating a temporary loopback account for each test measurement.

4. The method according to claim 1, further comprising interfacing a packet voice telephone voice system and a public switched telephone network (PSTN) via the hybrid circuit.

5. The method according to claim 1, further comprising generating a digital white noise signal and converting it to an analog white noise signal and inserting the analog white noise signal within a transport port of the hybrid circuit.

6. The method according to claim 1, further comprising receiving attenuated white noise from a receive port of the hybrid circuit and measuring the attenuated white noise for determining echo return loss.

7. The method according to claim 1, further comprising reserving an echo canceller channel connected to a Foreign Exchange Office (FXO) port under test.

8. An apparatus configured for performing operations comprising:
selecting a simulated balance impedance configuration within a filter connected to the hybrid circuit;
simulating balance impedances corresponding to selected impedance configurations by loading different coefficients within a transverse digital filter of a CODEC connected between the hybrid and an echo canceller;
inserting a test signal through the hybrid circuit onto the analog telephone line;
receiving a returned test signal from the analog telephone line through the hybrid circuit and measuring the echo return loss of the test signal corresponding to the selected simulated balance impedance configuration; and
determining an optimum balance impedance configuration based on the returned test signal.

9. The apparatus according to claim 8, further comprising creating a temporary loopback account for each test measurement.

10. The apparatus according to claim 8, further comprising generating a digital white noise signal and converting it to an analog white noise signal and inserting the analog white noise signal within a transport port of the hybrid circuit.

11. The apparatus according to claim 8, further comprising receiving attenuated white noise from a receive port of the hybrid circuit and measuring the attenuated white noise for determining echo return loss.

12. The apparatus according to claim 8, further comprising reserving an echo canceller channel connected to a Foreign Exchange Office (FXO) port under test.

13. A system for minimizing echo return loss in a communications network, comprising:
a hybrid that interfaces with a public switched telephone network (PSTN) and having selectable impedance configurations;
a CODEC connected to the hybrid and comprising a transverse digital filter and memory storing coefficients that are loaded into the transverse digital filter for simulating different impedance setting configurations;
an echo canceller connected to the CODEC; and
a packet voice converter circuit connected to the echo canceller that processes communications data as voice packets for transport to and from a packet voice network, wherein said hybrid, CODEC and echo canceller are configured for:
transmitting a DTMF digit for breaking the dial tone;
after the telephone line is quiet, inserting a test signal through the hybrid circuit to the PSTN corresponding to a selected impedance setting configuration;
receiving a returned test signal and measuring the echo return loss of the test signal corresponding to the selected impedance setting configuration; and
determining an optimum impedance setting configuration based on the results determined from the different test calls.

14. The system according to claim 13, further comprising a Foreign Exchange Office (FXO) port that is tested and to which the echo canceller connects and to which an echo canceller channel is reserved.

15. The system according to claim 13, wherein said packet voice converter network processes communications data using a time division multiplexing protocol.

16. The system according to claim 13, wherein the hybrid, CODEC and echo canceller are configured for:
dropping the test call;
repeating with multiple test calls each at a selectively different impedance setting configurations to obtain echo return loss measurements at each of the impedance setting configurations; and
applying the optimum impedance setting configuration to the hybrid that interfaces the PSTN by loading the memory coefficient set into the transverse digital filter corresponding to the optimum impedance setting configuration.

\* \* \* \* \*